United States Patent
Paik et al.

(10) Patent No.: US 9,360,736 B2
(45) Date of Patent: Jun. 7, 2016

(54) CAMERA MODULE

(71) Applicant: SAMSUNG ELECTRO-MECHANICS CO., LTD., Suwon-Si (KR)

(72) Inventors: Ki Mun Paik, Suwon-Si (KR); Jae Hyuk Lee, Suwon-Si (KR); Oh Byoung Kwon, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/269,045

(22) Filed: May 2, 2014

(65) Prior Publication Data

US 2015/0201112 A1 Jul. 16, 2015

(30) Foreign Application Priority Data

Jan. 16, 2014 (KR) .................. 10-2014-0005456

(51) Int. Cl.
*G02B 13/16* (2006.01)
*H04N 5/225* (2006.01)
*G03B 13/36* (2006.01)
*H04N 5/232* (2006.01)

(52) U.S. Cl.
CPC ............. *G03B 13/36* (2013.01); *H04N 5/2253* (2013.01); *H04N 5/2257* (2013.01); *H04N 5/23287* (2013.01)

(58) Field of Classification Search
CPC ... H04N 5/232; H04N 5/23212; H04N 5/228; H04N 5/335; H04N 5/2253; H04N 5/2254; H04N 5/2257; H04N 5/23287; G02B 7/022; G02B 27/646; G02B 7/09; G03B 3/10; G03B 5/00; G03B 13/36; G03B 2205/0015

USPC .................. 348/335, 340, 345, 348, 350, 352
IPC ................... H04N 5/232,5/23212, 5/228, 5/335
See application file for complete search history.

(56) References Cited

U.S. PATENT DOCUMENTS

| | | | | |
|---|---|---|---|---|
| 5,594,517 A | * | 1/1997 | Tsunefuji | ......................... 396/87 |
| 2009/0010140 A1 | * | 1/2009 | Ishii | ................... A61B 1/00096 369/112.23 |
| 2010/0295952 A1 | | 11/2010 | Oh | |
| 2012/0106936 A1 | * | 5/2012 | Lim | ......................... G03B 5/02 396/55 |
| 2012/0154614 A1 | | 6/2012 | Moriya | |
| 2013/0119785 A1 | * | 5/2013 | Han | ......................... 310/12.16 |

FOREIGN PATENT DOCUMENTS

| | | |
|---|---|---|
| JP | 2011-65140 A | 3/2011 |
| KR | 10-2010-0125777 A | 12/2010 |
| KR | 10-2012-0045333 A | 5/2012 |
| KR | 10-1259030 B1 | 4/2013 |
| KR | 101259030 B1 * | 4/2013 |

OTHER PUBLICATIONS

Korean Office Action issued on Jun. 24, 2015 in counterpart Korean Patent Application No. 10-2014-0005456 (14 pages, with English translation).

\* cited by examiner

*Primary Examiner* — Yogesh Aggarwal
(74) *Attorney, Agent, or Firm* — NSIP Law (57) ABSTRACT

A camera module may include: a frame having an opening formed therein; an auto-focusing unit mounted on the frame; and a position adjusting part formed in the auto-focusing unit. A distance from an optical axis to the position adjusting part may be smaller than a distance from the optical axis to the opening.

14 Claims, 7 Drawing Sheets

CAMERA MODULE

CROSS-REFERENCE TO RELATED APPLICATION

This application claims the benefit of Korean Patent Application No. 10-2014-0005456 filed on Jan. 16, 2014, with the Korean Intellectual Property Office, the disclosure of which is incorporated in its entirety herein by reference.

BACKGROUND

The present disclosure relates to a camera module in which an auto-focusing unit and a hand-shake correcting unit may be easily aligned with each other.

A high performance camera module includes an auto-focusing unit capable of adjusting a focal length. In addition, the camera module may also include a hand-shake correcting unit in order to significantly decrease a resolution deterioration phenomenon due to user hand-shake.

Since the camera module may simultaneously or individually perform an auto-focusing function and a hand-shake correcting function, it may enable clear images to be captured even in a relatively poor environment therefor.

Meanwhile, it is necessary to accurately align the auto-focusing unit and the hand-shake correcting unit with each other in order for the camera module to sufficiently realize its original function. However, in a camera module according to the related art, the auto-focusing unit and the hand-shake correcting unit are not aligned with each other, such that a phenomenon in which optical axes of the auto-focusing unit and the hand-shake correcting unit do not coincide with each other in a process of manufacturing the camera module occurs.

SUMMARY

Some embodiments of the present disclosure may provide a camera module in which an auto-focusing unit and a hand-shake correcting unit may be easily aligned with each other.

According to some embodiments of the present disclosure, a camera module may include: a frame having an opening formed therein; an auto-focusing unit mounted on the frame; and a position adjusting part formed in the auto-focusing unit, wherein a distance from an optical axis to the position adjusting part is smaller than a distance from the optical axis to the opening.

The position adjusting part may be formed on a lower surface of the auto-focusing unit.

The position adjusting part may be a groove formed in the auto-focusing unit and extended lengthwise in one direction.

The position adjusting part may be a plurality of grooves formed in the auto-focusing unit and extended lengthwise in different directions.

The position adjusting part may be a protrusion formed on the auto-focusing unit.

The camera module may further include a plurality of wires connecting the auto-focusing unit and the frame to each other.

The camera module may further include a hand-shake correcting unit adjusting a position of the auto-focusing unit.

The hand-shake correcting unit may include: a permanent magnet formed in the auto-focusing unit or the frame; and a coil formed in the frame or the auto-focusing unit.

The camera module may further include an auxiliary frame coupled to the frame and having an infrared cut-off filter mounted therein.

According to some embodiments of the present disclosure, a camera module may include: a frame having an opening formed therein; an auto-focusing unit mounted on the frame; and a position adjusting part formed in the auto-focusing unit, wherein the frame has an exposing groove formed therein in order to expose at least a part of the position adjusting part in an upward direction.

The position adjusting part may be formed on a lower surface of the auto-focusing unit.

The position adjusting part may be a groove formed in the auto-focusing unit and extended lengthwise in one direction.

The position adjusting part may be a plurality of grooves formed in the auto-focusing unit and extended lengthwise in different directions.

The position adjusting part may be a protrusion formed on the auto-focusing unit.

The camera module may further include a plurality of wires connecting the auto-focusing unit and the frame to each other.

The camera module may further include a hand-shake correcting unit adjusting a position of the auto-focusing unit.

The hand-shake correcting unit may include: a permanent magnet formed in the auto-focusing unit or the frame; and a coil formed in the frame or the auto-focusing unit.

The camera module may further include an auxiliary frame coupled to the frame and having an infrared cut-off filter mounted therein.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 1:
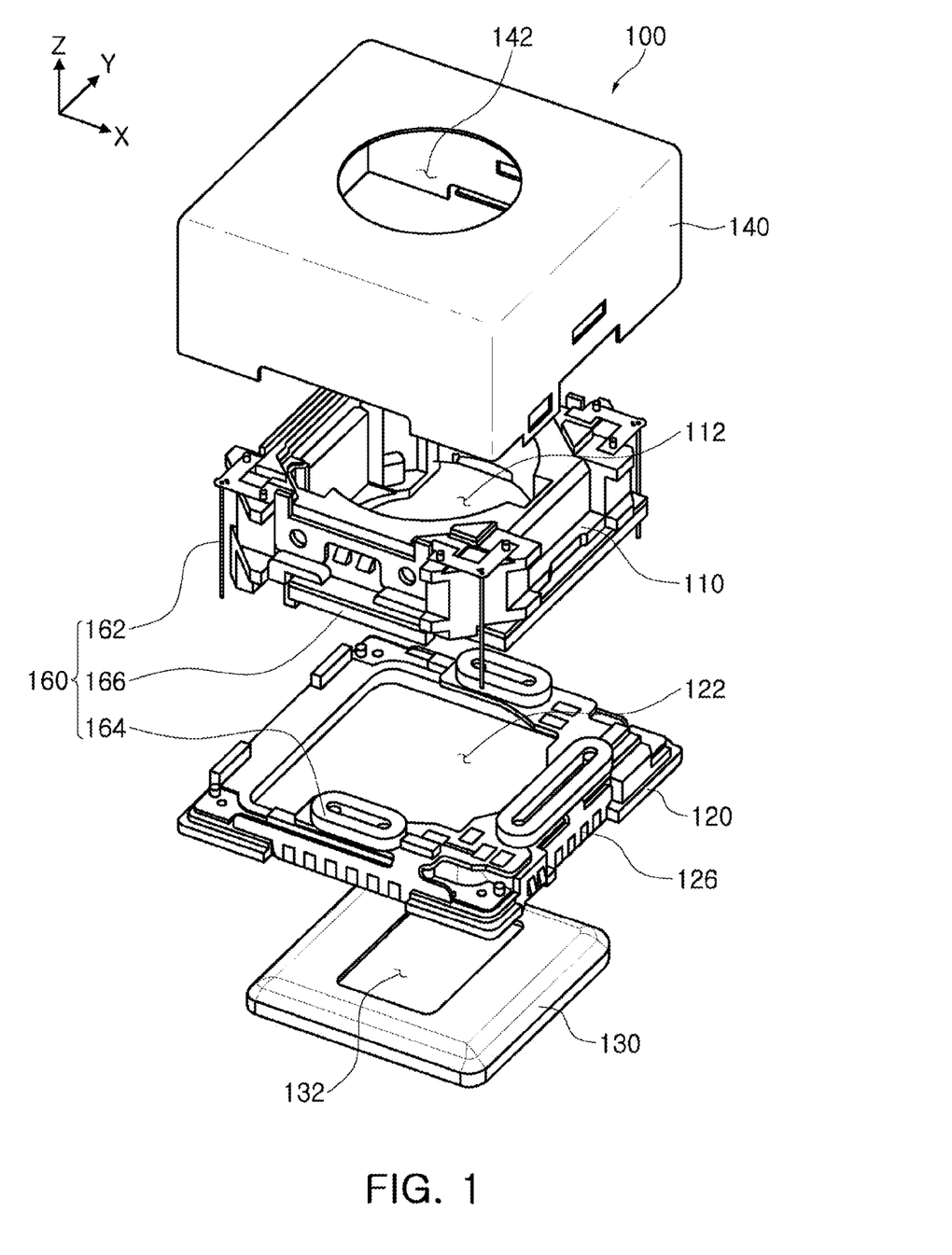
FIG. 1 is an exploded perspective view of a camera module according to an exemplary embodiment of the present disclosure.
Figure 2:
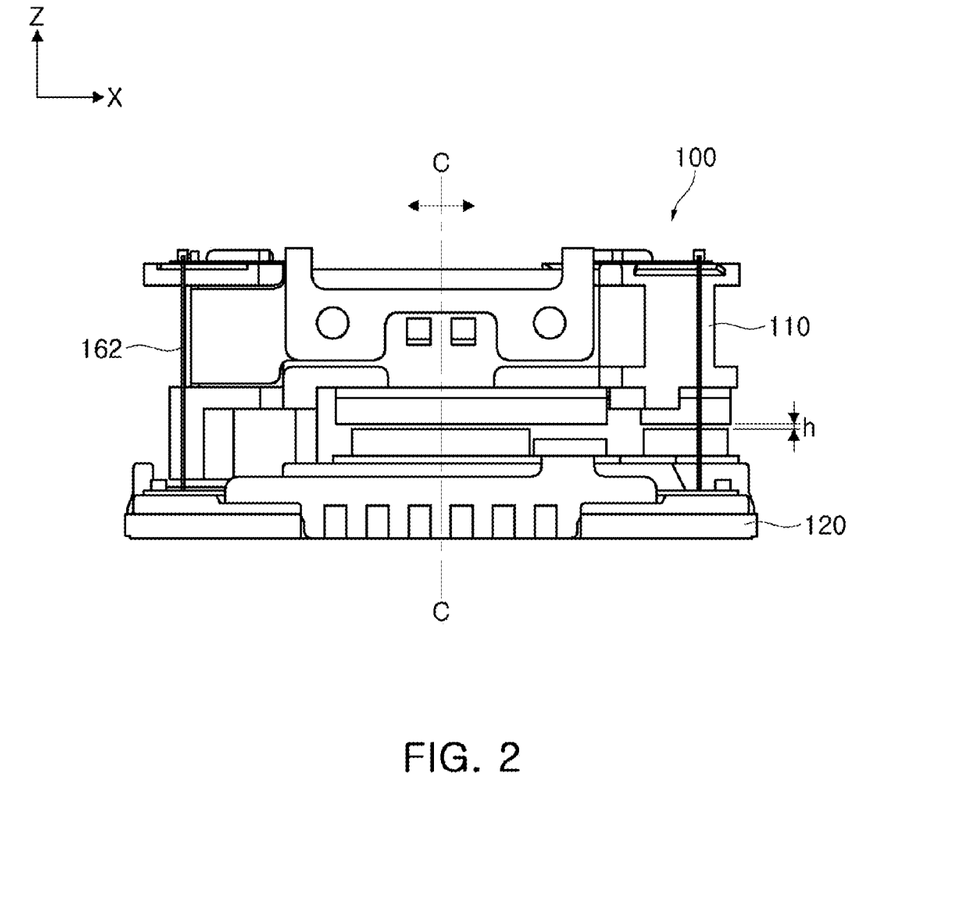
FIG. 2 is a side view of the camera module illustrated in FIG. 1.
Figure 3:
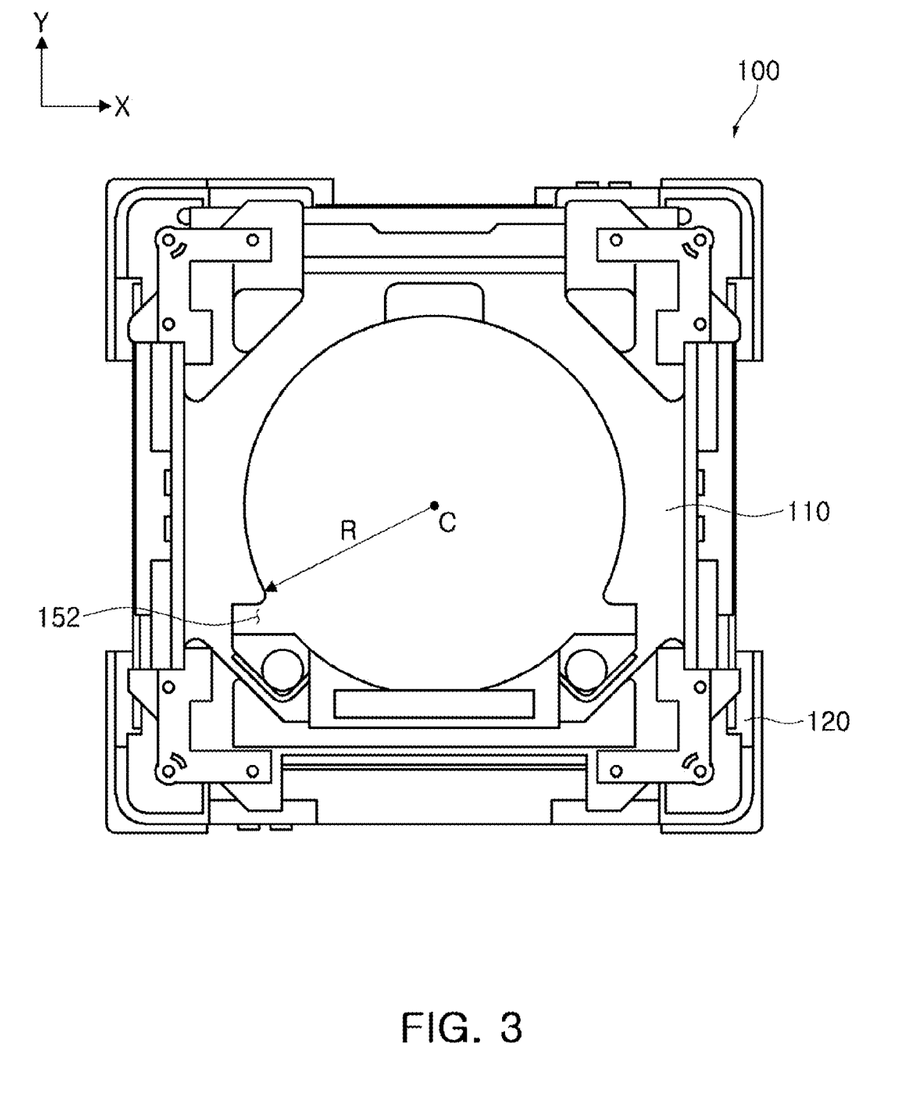
FIG. 3 is a plan view of the camera module illustrated in FIG. 1.
Figure 4:
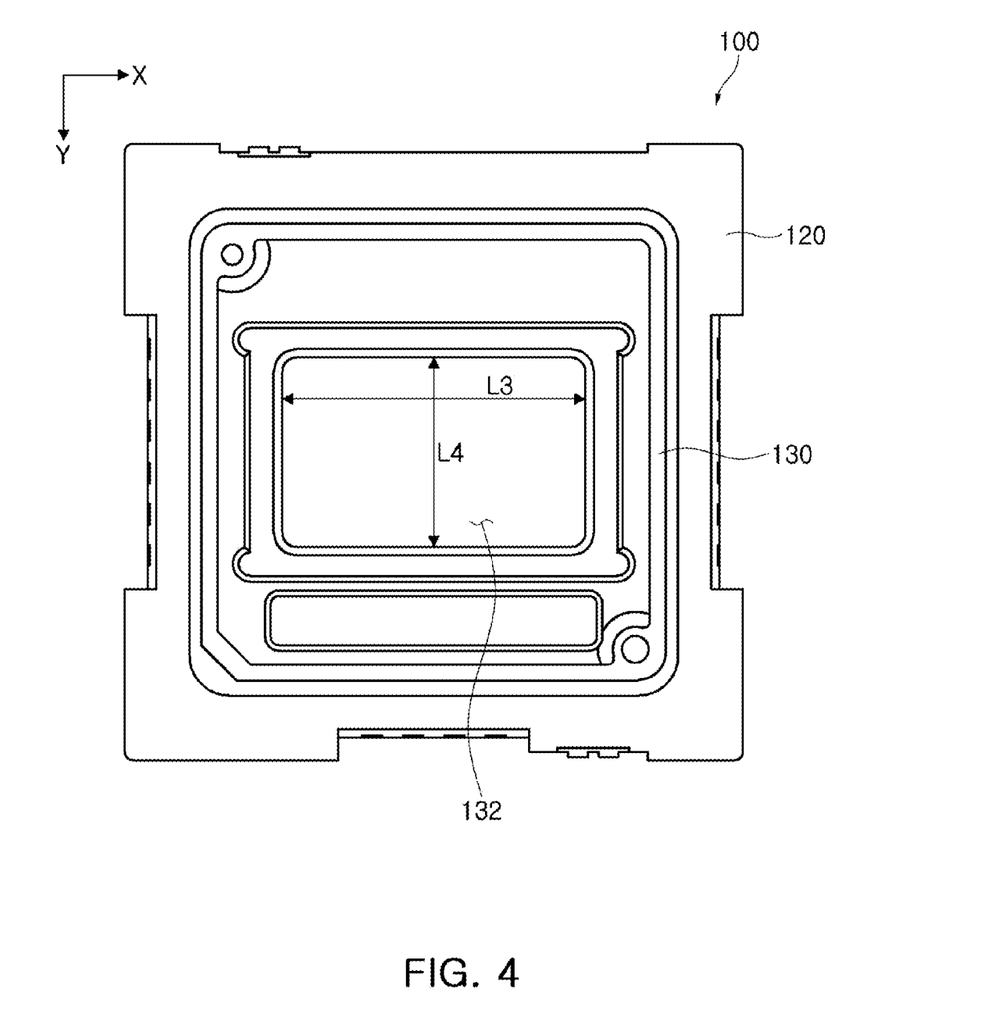
FIG. 4 is a bottom view of the camera module illustrated in FIG. 1.
Figure 5:
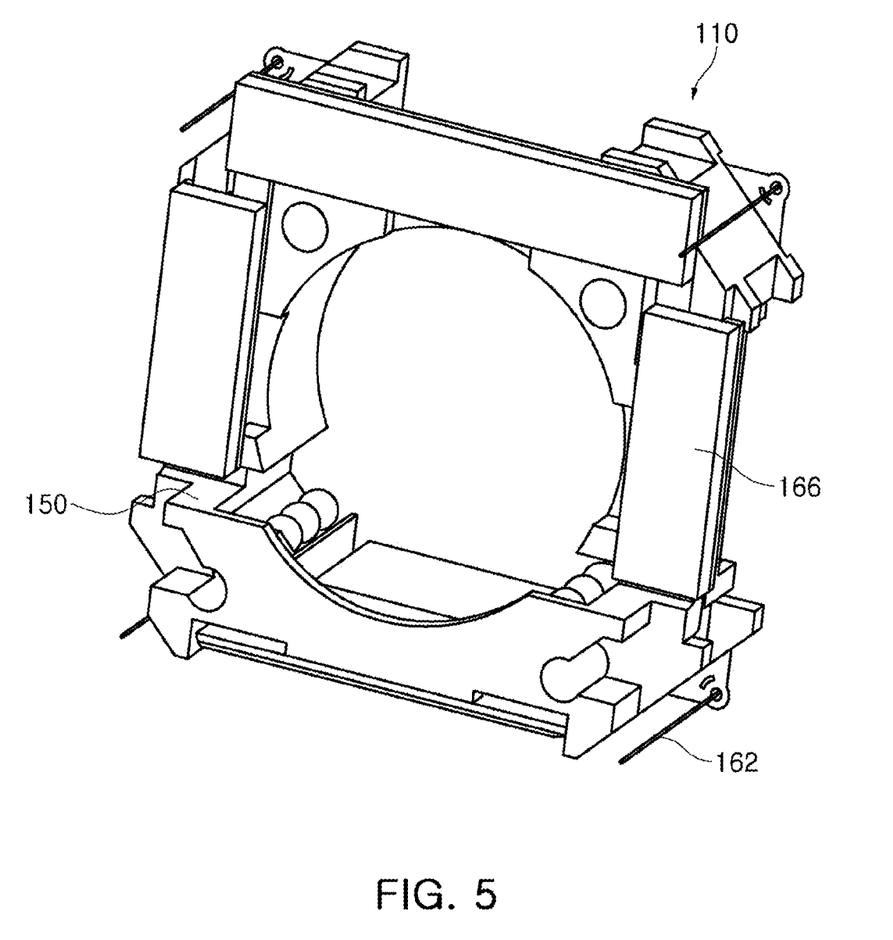
FIG. 5 is a bottom perspective view of an auto-focusing unit illustrated in FIG. 1.
Figure 6:
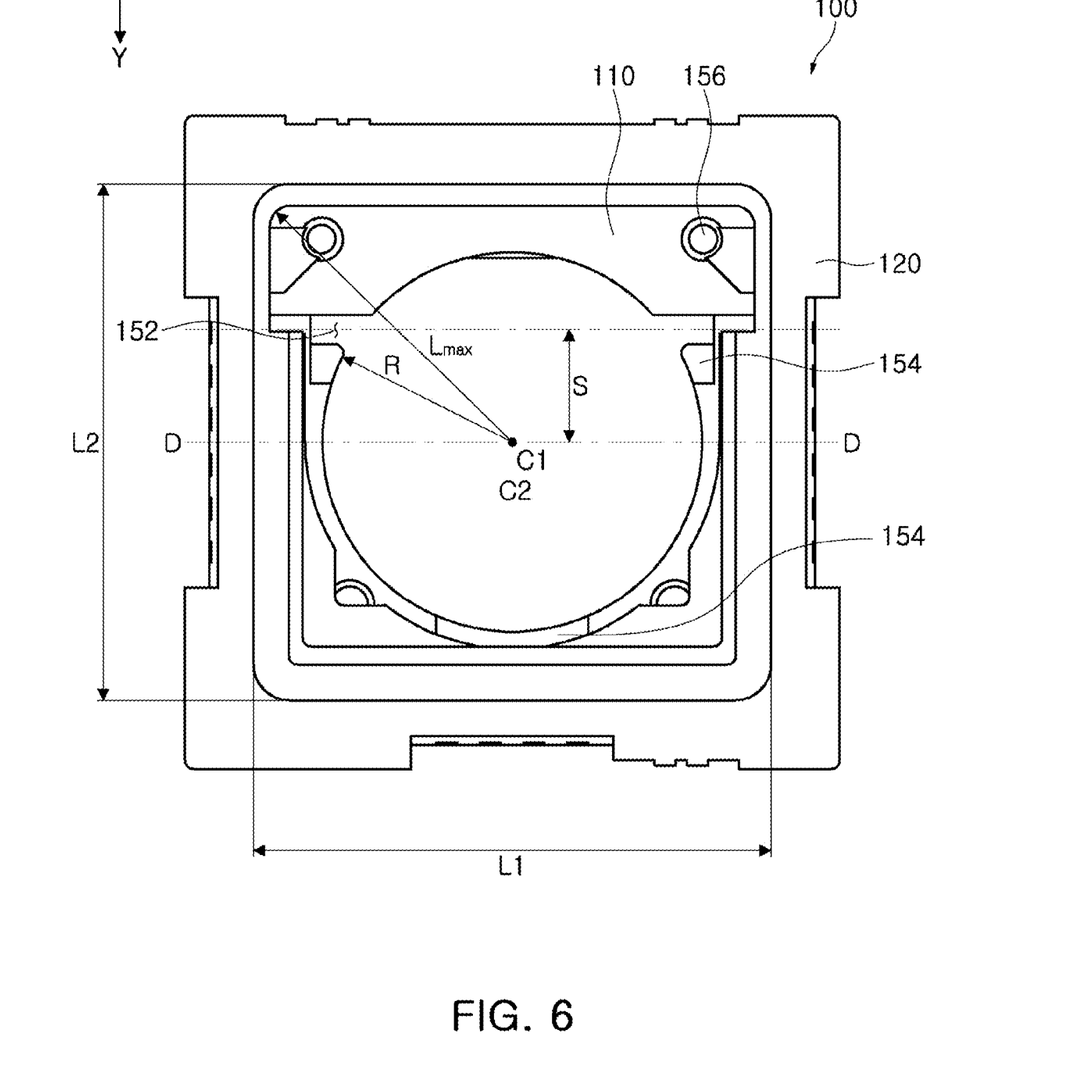
FIG. 6 is a bottom view of an auto-focusing unit in a state in which the auto-focusing unit is coupled to a frame.
Figure 7:
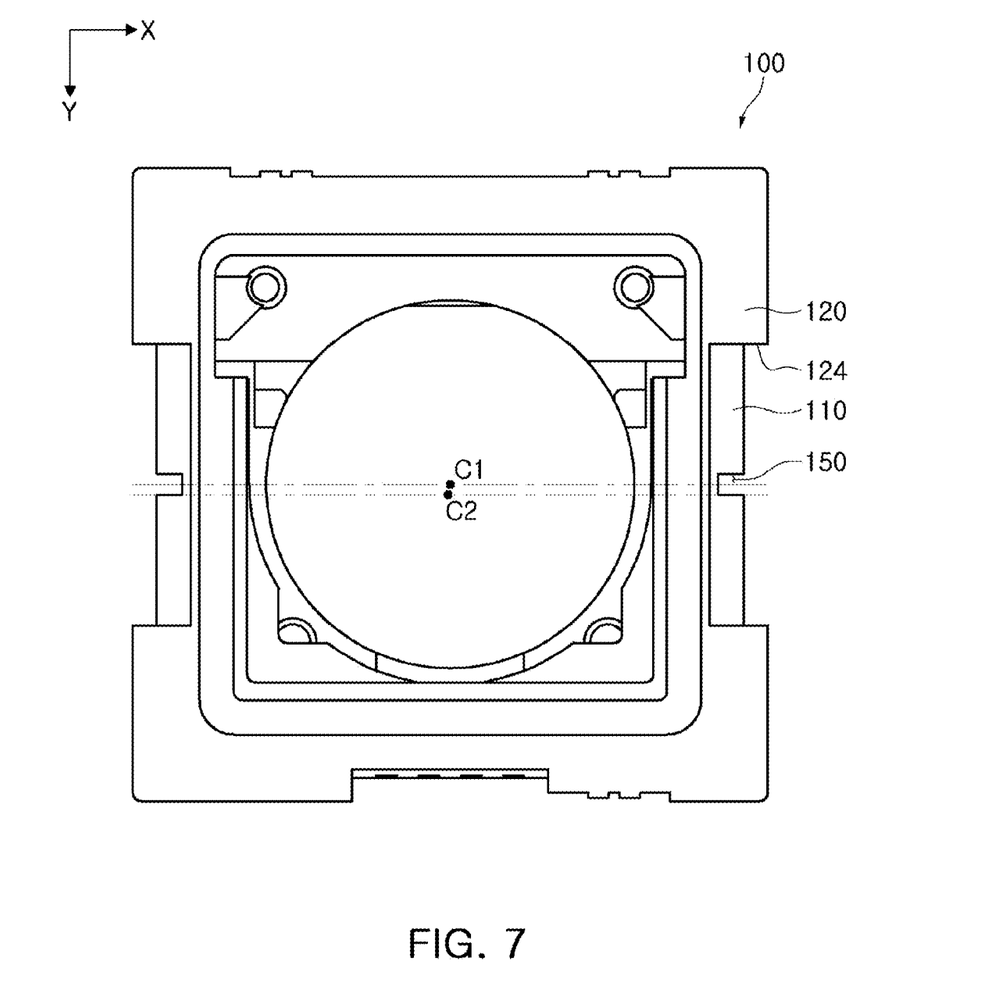
FIG. 7 is a bottom view of a camera module according to another exemplary embodiment of the present disclosure.

FIG. 1 is an exploded perspective view of a camera module according to an exemplary embodiment of the present disclosure; FIG. 2 is a side view of the camera module illustrated in FIG. 1; FIG. 3 is a plan view of the camera module illustrated in FIG. 1; FIG. 4 is a bottom view of the camera module illustrated in FIG. 1; FIG. 5 is a bottom perspective view of an auto-focusing unit illustrated in FIG. 1; FIG. 6 is a bottom view of an auto-focusing unit in a state in which the auto-focusing unit is coupled to a frame; and FIG. 7 is a bottom view of a camera module according to another exemplary embodiment of the present disclosure.

A camera module according to an exemplary embodiment of the present disclosure will be described with reference to FIGS. 1 through 6.

A camera module according to the present exemplary embodiment may include an auto-focusing unit 110, a frame 120, an auxiliary frame 130, and a shield case 140. In addition, the camera module 100 may further include a hand-shake correcting unit 160. Further, the camera module 100 may further include one or more lenses (not shown). Further, the camera module 100 may further include an image sensor (not shown). Further, the camera module 100 may further include an infrared cut-off filter (not shown). Further, the camera module 100 may further include one or more stops (not shown) adjusting an amount of incident light.

The camera module 100 configured as described above may be mounted in a portable camera, a portable phone, a portable notebook computer, or other portable electronic devices.

Next, main components of the camera module 100 will be described with reference to FIG. 1.

The auto-focusing unit 110 may move a lens barrel in an optical axis direction. For example, the auto-focusing unit 110 may have an accommodating space 112 in which the lens barrel is accommodated and include an actuator moving the lens barrel accommodated in the accommodating space 112. Here, the lens barrel may be a member in which one or more lenses are accommodated. In addition, the actuator may be a smooth impact drive mechanism (SIDM) type component (for example, a piezoelectric element) physically contacting the lens barrel to move the lens barrel or a magnetic force use type component (for example, a permanent magnet and a coil) moving the lens barrel in a state in which it does not contact the lens barrel.

The auto-focusing unit 110 may limit a moving direction of the lens barrel. For example, the auto-focusing unit 110 may include a bearing making movement of the lens barrel smooth. The auto-focusing unit 110 may include a guide member limiting the moving direction of the lens barrel. For example, an inner side of the auto-focusing unit 110 may be provided with a guide groove or a guide protrusion.

The auto-focusing unit 110 configured as described above may be connected to the frame 120 by a plurality of wires 162. In addition, the auto-focusing unit 110 may be maintained at a predetermined height h with respect to an upper surface of the frame 120. Therefore, the auto-focusing unit 110 may be moved in a direction substantially perpendicular to an optical axis C-C. For reference, although the case in which the auto-focusing unit 110 and the frame 120 are connected to each other by four wires 162 has been shown in the accompanying drawings, the number of wires 162 may be increased or decreased, if necessary.

The frame 120 may move the auto-focusing unit 110 in the direction perpendicular to the optical axis. For example, the frame 120 may perform a hand-shake correction function. To this end, the frame 120 may include at least some components of the hand-shake correcting unit 160. For example, the frame 120 may include a coil 164 or a permanent magnet formed therein.

The frame 120 may be connected to the auto-focusing unit 110 by the wires 162, as described above. Here, the wires 162 may be formed at corner portions of the frame 120, respectively. However, positions of the wires 162 are not limited to the corner portions of the frame 120.

The frame 120 may have an opening 122 formed therein. The opening 122 may be a substantially rectangular hole. For example, the opening 122 may be a square or rectangular hole having a first length L1 in an X axis direction and a second length L2 in a Y axis direction (See FIG. 6). Here, the opening 122 may be larger than a diameter of the accommodating space 112. For example, a minimum width L1 or L2 may be larger than the diameter (2*R) of the accommodating space 112. In addition, a distance Lmax (half of a diagonal length of the opening) from the optical axis C-C to the longest point of the opening 122 may be larger than a distance R from the optical axis C-C to a position adjusting part 150. This limitation may allow the position adjusting part 150 to be easily identified through the opening 122.

The frame 120 may include a plurality of terminals 126 formed thereon. For example, the frame 120 may include the terminals 126 formed on upper and lower surfaces and side surfaces thereof in order to electrically control the auto-focusing unit 110 and the hand-shake correcting unit 160. Here, the terminals 126 may be connected to the auto-focusing unit 110 and the hand-shake correcting unit 160 by a wire, a flexible printed circuit board (FPCB), or the like.

The auxiliary frame 130 may be coupled to the frame 120. For example, the auxiliary frame 130 may b detachably mounted on a lower surface of the frame 120. The auxiliary frame 130 may include a window 132 formed therein. The window 132 may adjust an amount of light incident to the image sensor. For example, the window 132 may have a size that becomes large or small in proportion to a size of the image sensor. In addition, the window 132 may have a size that is substantially equal or similar to an aspect ratio of the image sensor. For example, the window 132 may have a substantially rectangular shape. For reference, a length L3 of the window 132 in the X axis direction and a length L4 of the window 132 in the Y axis direction may be equal to or smaller than the length L1 of the opening 122 in the X axis direction and the length L2 of the opening 122 in the Y axis direction, respectively. However, a length of the window 132 at one side thereof may be equal to or larger than that of the opening 122 at one side thereof, if necessary. For example, the length L3 of the window 132 in the X axis direction may be substantially equal to the length L1 of the opening par 122 in the X axis direction.

The shield case 140 may protect the auto-focusing unit 110 and the hand-shake correcting unit 160 from harmful electromagnetic waves. For example, the shield case 140 may have a hexahedral shape in which one surface thereof is opened so as to accommodate the auto-focusing unit 110 and the hand-shake correcting unit 160 therein. The shield case 140 may be made of a metal. The metal may be useful for blocking the harmful electromagnetic waves. However, a material of the shield case 140 is not limited to the metal. For example, the shield case 140 may be formed of any material capable of blocking the harmful electromagnetic waves. In addition, the shield case 140 may be manufactured by injection-molding. In this case, the shield case 140 may be formed of plastic, and may serve to protect the auto-focusing unit 110 and the hand-shake correcting unit 160 from external impact. Meanwhile, one surface of the shield case 140 may be provided with a hole 142 through which effective light is incident, as illustrated in FIG. 1.

The hand-shake correcting unit 160 may correct shaking of the auto-focusing unit 110. For example, the hand-shake correcting unit 160 may move the auto-focusing unit 110 in the direction substantially perpendicular to the optical axis C-C. To this end, the hand-shake correcting unit 160 may include the wires 162, the coil 164, and the permanent magnet 166. However, this configuration is only an example. That is, the hand-shake correcting unit 160 may also be configured of other components, if necessary.

The wires 162 may connect the auto-focusing unit 110 and the frame 120 to each other. For example, the wires 162 may be extended from corners of the frame 120 in one direction, respectively, and be connected to corners (elastic members of the corners) of the auto-focusing unit 110, respectively. The wires 162 may be formed of a conductive material. In this case, the wires 162 may transfer electrical signals transferred from the frame 120 to the auto-focusing signal 110.

The coil 164 may be formed in the auto-focusing unit 110 and the frame 120. For example, the coil 164 may be formed at a portion at which the auto-focusing unit 110 and the frame 120 may face each other. For reference, although the case in which the coil 164 is formed on the upper surface of the frame 120 has been described in the present exemplary embodiment, the coil 164 may also be formed at another portion, if necessary.

The permanent magnet 166 may be formed in the auto-focusing unit 110 and the frame 120. For example, the permanent magnet 166 may be formed at a portion at which the auto-focusing unit 110 and the frame 120 may face each other. For reference, although the case in which the permanent magnet 166 is formed on a lower surface of the auto-focusing unit 110 has been described in the present exemplary embodiment, the permanent magnet 166 may also be formed at another portion, if necessary.

Next, the position adjusting part 150 will be described with reference to FIGS. 3 through 6.

The position adjusting part 150 may be formed in the auto-focusing unit 110. For example, the position adjusting part 150 may be formed on the lower surface of the auto-focusing unit 110. The position adjusting part 150 may adjust a relative position of the auto-focusing unit 110 to the frame 120. For example, the position adjusting part 150 may allow the auto-focusing unit 110 to be easily grasped through the opening 112 of the frame 120 or allow the auto-focusing unit 110 to be easily moved.

As an example, in the present exemplary embodiment, the position adjusting part 150 may be a hole 152, a protrusion 154, or the like, formed in the lower surface of the auto-focusing unit 110. As another example, the position adjusting part 150 may be a groove 156 formed in the lower surface of the auto-focusing unit 110. Here, the hole 152 and the groove 156 may be formed in order to allow a jig to easily grip the auto-focusing unit 110. In addition, the hole 152 and the groove 156 may be formed in order to allow the auto-focusing unit 110 and the frame 120 to be easily aligned with each other. Meanwhile, the protrusion 154 may be formed in order to allow the auto-focusing unit 110 to be maintained in a horizontal state to the frame 120. In addition, the protrusion 154 may be formed in order to allow the lower surface of the auto-focusing unit 110 to be maintained at a predetermined height with respect to the upper surface of the frame 120. To this end, the protrusion 154 may be extended lengthwise from the auto-focusing unit 110 toward the frame 120. In addition, the protrusion 154 may be formed in order to align an optical axis C1 of the auto-focusing unit 110 and an optical axis C2 of the frame 120 with each other. To this end, at least one protrusion 154 may be extended lengthwise so as to contact an inner surface of the opening 122 of the frame 120. For example, the protrusion 154 may guide an inner surface of a radius R based on the frame 120 to align the optical axis C1 of the auto-focusing unit 110 and the optical axis C2 of the frame 120 with each other.

The position adjusting part 150 may be spaced apart from the optical axis C-C by a predetermined distance in the direction perpendicular to the optical axis C-C. For example, the position adjusting part 150 may be spaced apart from the optical axis C-C by a distance of R. Here, the R may be larger than an effective radius of the lens. This limitation may decrease an interference phenomenon due to the position adjusting part 150. In addition, the position adjusting part 150 may be formed at a point biased toward one side based on a bisector D-D of the auto-focusing unit 110. For example, the position adjusting part 150 may be formed at a point spaced apart from the bisector D-D by S in the Y axis direction.

In the camera module 100 configured as described above, since a part (particularly, position adjusting part 150) of a body of the auto-focusing unit 110 is exposed through the opening 122 of the frame 120, a position of the auto-focusing unit 110 is adjusted in a process of manufacturing the camera module 100, whereby the optical axis C1 of the auto-focusing unit 110 and the optical axis C2 of the frame 120 may be easily aligned with each other.

Next, a camera module according to another exemplary embodiment of the present disclosure will be described with reference to FIG. 7. For reference, since components other than a frame 120 and a position adjusting part 150 in a description of a camera module according to the present exemplary embodiment are substantially the same of those of the camera module according to an exemplary embodiment of the present disclosure described above, a detailed description thereof will be omitted.

A camera module 100 according to the present exemplary embodiment may be different in the frame 120 and the position adjusting part 150 from the camera module 100 according to an exemplary embodiment of the present disclosure described above. For example, the frame 120 may have an exposing groove 124 formed at an edge thereof in order to expose a part of the auto-focusing unit 110. The exposing groove 124 may be extended from the edge of the frame 120 toward the optical axis. In addition, the position adjusting part 150 may be formed at an edge of the auto-focusing unit 110. For example, the position adjusting part 150 may be formed at a position corresponding to the exposing groove 124. In addition, the position adjusting part 150 may have a groove shape in which it is extended lengthwise from the edge of the auto-focusing unit 110 toward the optical axis.

In the camera module 100 formed as described above, the position adjusting part 150 is not formed in the vicinity of the opening 122 through which effective light is incident, which may be advantageous in suppressing unnecessary spill light from being incident to or being reflected on the image sensor.

As set forth above, according to exemplary embodiments of the present disclosure, resolution of the camera module may be improved.

While exemplary embodiments have been shown and described above, it will be apparent to those skilled in the art that modifications and variations could be made without departing from the spirit and scope of the present disclosure as defined by the appended claims.

What is claimed is:

1. A camera module comprising:
a frame having an opening formed therein;
an auto-focusing unit mounted on the frame; and
a position adjusting part formed in the auto-focusing unit, wherein a perpendicular distance from an optical axis to the position adjusting part is smaller than a perpendicular distance from the optical axis to the opening, and the position adjusting part is a plurality of grooves formed in the auto-focusing unit and extending lengthwise in different directions.

2. The camera module of claim 1, wherein the position adjusting part is formed on a lower surface of the auto-focusing unit.

3. The camera module of claim 1, wherein the position adjusting part is a protrusion formed on the auto-focusing unit.

4. The camera module of claim 1, further comprising a plurality of wires connecting the auto-focusing unit and the frame to each other.

5. The camera module of claim 1, further comprising a hand-shake correcting unit adjusting a position of the auto-focusing unit.

6. The camera module of claim 5, wherein the hand-shake correcting unit includes:
   a permanent magnet formed in the auto-focusing unit or the frame; and
   a coil formed in the frame or the auto-focusing unit.

7. The camera module of claim 1, further comprising an auxiliary frame coupled to the frame and having an infrared cut-off filter mounted therein.

8. A camera module comprising: a frame having an opening formed therein; an auto-focusing unit mounted on the frame; and a position adjusting part formed in the auto-focusing unit, wherein the frame has an exposing groove formed therein in order to expose at least a part of the position adjusting part in an upward direction, and the position adjusting part is a plurality of grooves formed in the auto-focusing unit and extended lengthwise in different directions.

9. The camera module of claim 8, wherein the position adjusting part is formed on a lower surface of the auto-focusing unit.

10. The camera module of claim 8, wherein the position adjusting part is a protrusion formed on the auto-focusing unit.

11. The camera module of claim 8, further comprising a plurality of wires connecting the auto-focusing unit and the frame to each other.

12. The camera module of claim 8, further comprising a hand-shake correcting unit adjusting a position of the auto-focusing unit.

13. The camera module of claim 12, wherein the hand-shake correcting unit includes:
   a permanent magnet formed in the auto-focusing unit or the frame; and
   a coil formed in the frame or the auto-focusing unit.

14. The camera module of claim 8, further comprising an auxiliary frame coupled to the frame and having an infrared cut-off filter mounted therein.

* * * * *